US012673548B2

(12) United States Patent　(10) Patent No.: US 12,673,548 B2

Williams　(45) Date of Patent:　Jul. 7, 2026

(54) RADIAL WHEEL MOTOR SUPPORTED ON AUXILIARY BEARINGS IN A PARALLEL ARRANGEMENT

(71) Applicant: Kevin R. Williams, Waller, TX (US)

(72) Inventor: Kevin R. Williams, Waller, TX (US)

( * ) Notice: Subject to any disclaimer, the term of this patent is extended or adjusted under 35 U.S.C. 154(b) by 392 days.

(21) Appl. No.: 18/462,138

(22) Filed: Sep. 6, 2023

(65) Prior Publication Data

US 2025/0074182 A1　Mar. 6, 2025

(51) Int. Cl.
| | |
|---|---|
| *B60K 7/00* | (2006.01) |
| *B60K 1/04* | (2019.01) |
| *B60L 15/20* | (2006.01) |
| *B62D 7/18* | (2006.01) |
| *H02K 11/00* | (2016.01) |
| *H02K 21/14* | (2006.01) |

(52) U.S. Cl.
CPC .............. *B60K 7/0007* (2013.01); *B60K 1/04* (2013.01); *B60L 15/20* (2013.01); *B62D 7/18* (2013.01); *H02K 11/0094* (2013.01); *H02K 21/14* (2013.01); *B60K 2001/045* (2013.01)

(58) Field of Classification Search
CPC .......... B60K 7/0007; B60K 2007/0038; B60K 2001/045; B60L 15/20; B62D 7/18; H02K 11/0094; H02K 21/14
See application file for complete search history.

(56) References Cited

U.S. PATENT DOCUMENTS

| | | | | |
|---|---|---|---|---|
| 5,343,128 | A * | 8/1994 | Beltrame | ............. B60K 7/0007 318/296 |
| 5,767,595 | A | 6/1998 | Rosen | |

| | | | | |
|---|---|---|---|---|
| 6,819,012 | B1 | 11/2004 | Gabrys | |
| 7,552,787 | B1 | 6/2009 | Williams | |
| 9,862,264 | B2 | 1/2018 | Lampic | |
| 11,279,255 | B2 * | 3/2022 | Layfield | ............... B60K 7/0007 |
| 12,463,496 | B2 * | 11/2025 | Hubert | |
| 2004/0079567 | A1 * | 4/2004 | Beltrame | ............... H02K 11/20 180/65.51 |
| 2016/0068054 | A1 | 3/2016 | Abe | |
| 2024/0300316 | A1 * | 9/2024 | Jeon | ...................... B60K 7/0007 |
| 2025/0015737 | A1 * | 1/2025 | Nagel | |

FOREIGN PATENT DOCUMENTS

| | | | | |
|---|---|---|---|---|
| EP | 2658096 | A2 | 4/2022 | |
| WO | WO-2006137188 | A1 * | 12/2006 | ........... H02K 7/1025 |
| WO | WO-2024150253 | A1 * | 7/2024 | ............... H02K 5/10 |

* cited by examiner

*Primary Examiner* — James A Shriver, II
*Assistant Examiner* — Nicholas R. Kandas
(74) *Attorney, Agent, or Firm* — EGBERT, MCDANIEL & SWARTZ, PLLC

(57)　　　　　　ABSTRACT

A wheel assembly for a vehicle has a rotor housing adapted to be affixed to a non-rotatable portion of the vehicle, a stator housing adapted to be affixed to a wheel hub of the vehicle so as to be rotatable relative to the rotor housing, and an energy storage module affixed only to the stator housing. The stator housing has a support structure having a wheel rim. The rotor housing has permanent magnets therein. The stator housing has windings therein. The windings of the stator housing and the permanent magnets of the rotor housing define an air gap therebetween. The air gap extends concentric to an axis of rotation of the wheel hub. The wheel assembly is cooperative with the windings of the stator housing so as to receive energy from the windings and transmit energy to the windings relative to a motion of the vehicle.

12 Claims, 6 Drawing Sheets

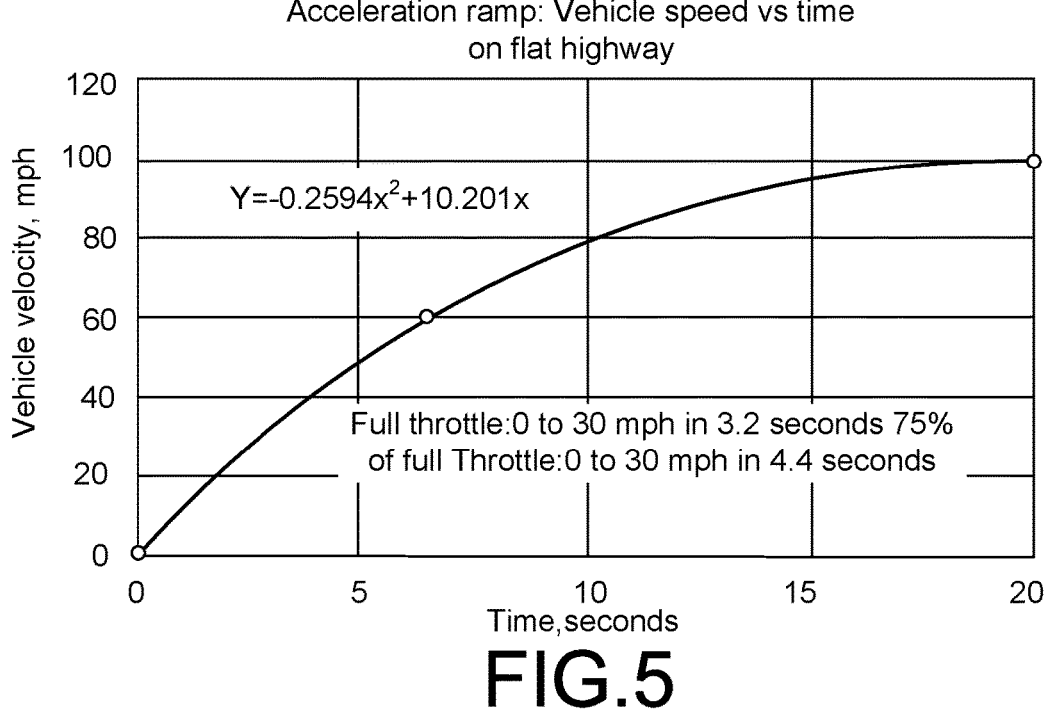

Acceleration ramp: Vehicle speed vs time on flat highway $Y = -0.2594x^2 + 10.201x$ Full throttle: 0 to 30 mph in 3.2 seconds 75% of full Throttle: 0 to 30 mph in 4.4 seconds

FIG.5

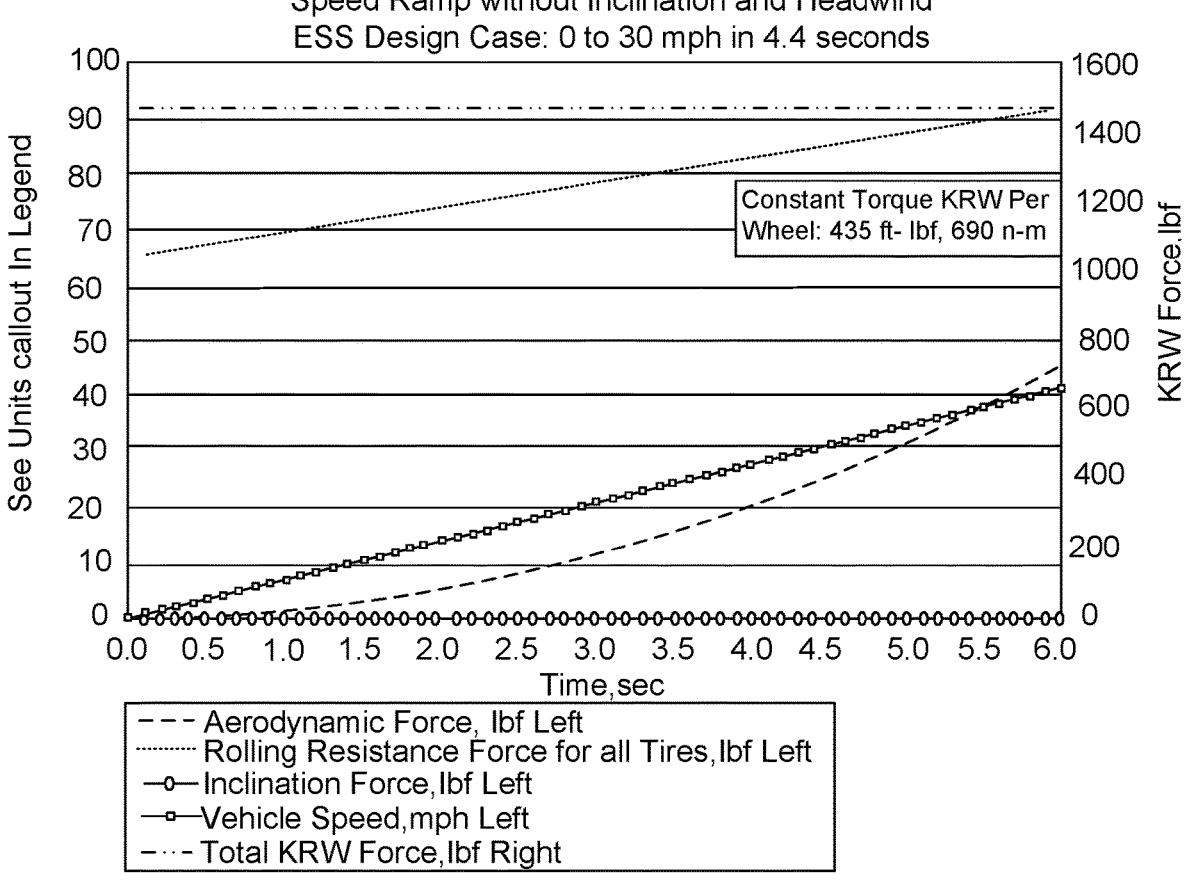

Speed Ramp without Inclination and Headwind
ESS Design Case: 0 to 30 mph in 4.4 seconds Constant Torque KRW Per Wheel: 435 ft- lbf, 690 n-m

- - - Aerodynamic Force, lbf Left
········· Rolling Resistance Force for all Tires, lbf Left
—o— Inclination Force, lbf Left
—□— Vehicle Speed, mph Left
- ··· Total KRW Force, lbf Right

FIG. 6

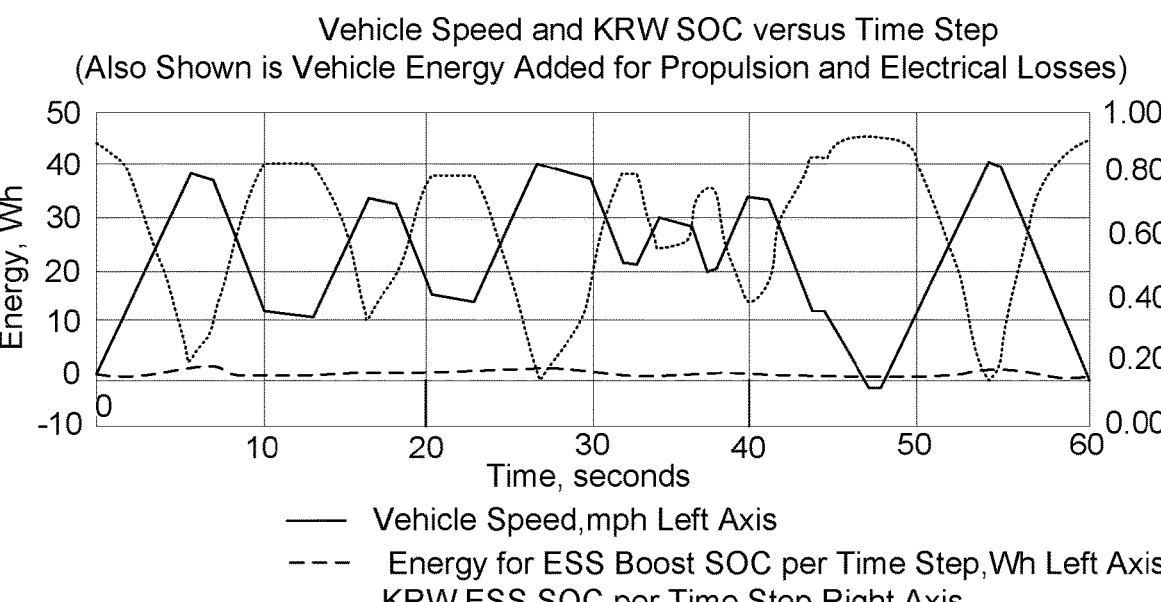

Vehicle Speed and KRW SOC versus Time Step
(Also Shown is Vehicle Energy Added for Propulsion and Electrical Losses)

—— Vehicle Speed,mph Left Axis

– – – Energy for ESS Boost SOC per Time Step,Wh Left Axis

·········· KRW ESS SOC per Time Step Right Axis

FIG.9

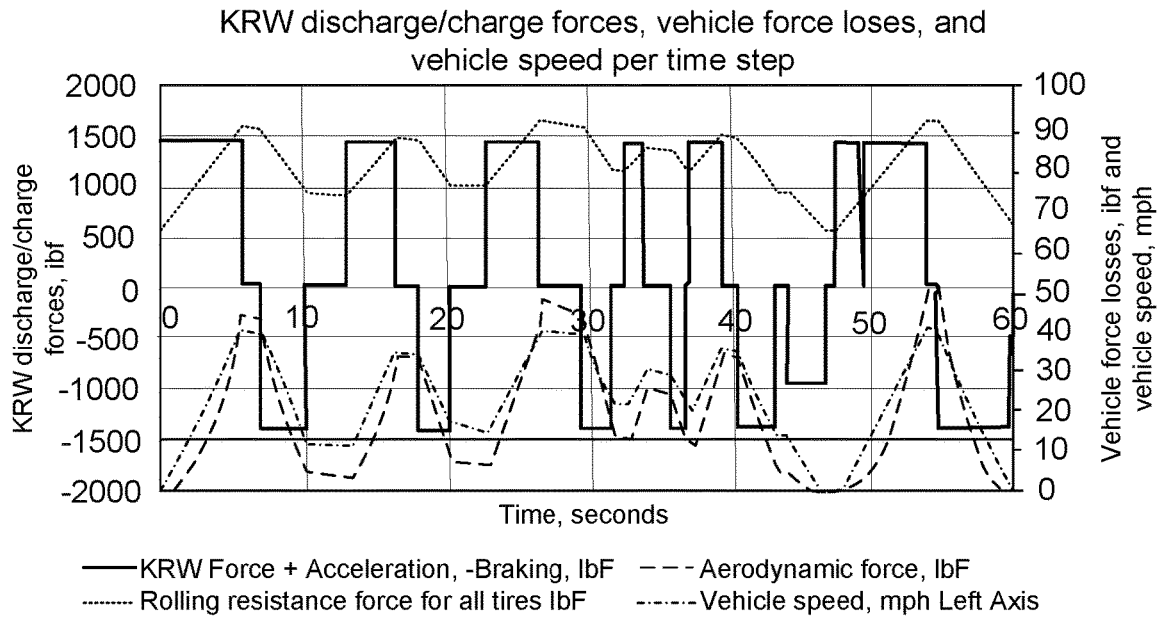

KRW discharge/charge forces, vehicle force loses, and
vehicle speed per time step ——KRW Force + Acceleration, -Braking, IbF    – – –Aerodynamic force, IbF
········ Rolling resistance force for all tires IbF    –·–·–Vehicle speed, mph Left Axis

FIG.10

RADIAL WHEEL MOTOR SUPPORTED ON AUXILIARY BEARINGS IN A PARALLEL ARRANGEMENT

CROSS-REFERENCE TO RELATED APPLICATIONS

Not applicable.

BACKGROUND OF THE INVENTION

1. Field of the Invention

The present invention relates to wheel motors. More particularly, the present invention relates to radial gap wheel motors that are supported on auxiliary and hub bearings. More particularly, the present invention relates to wheel motors that can be retrofitted to existing wheel stations of vehicles and in which an energy storage module is positioned on the wheel.

2. Description of Related Art

As the price of fossil fuel rises and more and more people are utilizing personal vehicles as a means for transportation, the demand for fuel continues to increase. The population of the world is increasing, but just as importantly, the general population of many countries, which historically did not have personal engine-driven vehicles, is on the rise. There is also more and more demand for hybrid-electric vehicles, fuel cells, and electric means for transportation. These are designed for the most efficient means of converting energy to propulsion with the least amount of energy consumed.

In the conservation of energy, losses during the braking action of a motorized vehicle can be stored and reused during the acceleration of the vehicle. The efficiency of energy consumption for propulsion is increased and less energy is used because of capturing and reusing the energy that is normally burned as excess heat in the vehicle's braking system. There are many proven technologies which utilize this method of energy recovery. These technologies date back twenty or thirty years and are utilized on many hybrid electric vehicles.

A major problem with existing hybrid electric vehicles is the fact that the entire vehicle must be purchased in order to obtain the benefits of the electric propulsion. There have been, in the past, systems wherein the internal combustion engine can be retrofitted or converted into a hybrid vehicle. The ease of conversion is very important so as to facilitate the conservation and use of energy. With the tightening of federal emissions regulations combined with public concern over transportation-related pollution, the market for electric vehicles is growing. However, even with increased production, electric vehicles remain more expensive than comparably-performing fossil-fueled vehicles. As such, there has been a need for a low-cost retrofit for fossil-fueled cars and trucks that provides performance improvement during start-and-go-stop traffic (<40 miles per hour) so as to reduce fuel use and emissions. There is also a need for secondary action to assist with power boost at highway speed. It is important to be able to retrofit such vehicles including off-road vehicles, along with both personal and commercial vehicles. Also, there is a need to be able to retrofit conventional bicycles so as to provide electric bicycles at lower cost.

In the past, a variety of in-wheel motors have been provided in the prior art. For example, U.S. Pat. No. 7,552,787, issued on Jun. 30, 2009 to K. R. Williams, describes an energy-recoverable wheel motor for attachment to an axle. This energy-recoverable wheel motor has a motor mount plate suitable for attachment to the axle, a rim defining an outward periphery of the wheel, a flywheel mounted interior of the rim and freely rotatable relative to the motor mount plate, a first rotor motor affixed to an interior surface of the flywheel so as to rotate with a rotation of the flywheel, and a second stator motor fixedly positioned relative to the first rotor motor. A second stator motor is affixed to the motor mount plate. A stator motor is fixedly positioned relative to the second stator motor. The first stator motor is affixed to one side of the vehicle mounting plate. The second rotor motor is affixed to an opposite side of the vehicle mounting plate.

European Patent No. 2658096, published on Apr. 27, 2022 to M. Broughtwood, describes an electric motor or generator for mounting in a wheel of a road vehicle. This electric motor or generator has a stator having a plurality of coils, a rotor having a radial wall and a circumferential wall in which a plurality of magnets are mounted on the inside of the circumferential wall surrounding the coils of the stator, a bearing block having a first part affixed to the stator and a second part affixed to the rotor. The radial wall of the stator has a central portion for mounting to a vehicle on one side and for connection to the first part of the bearing block. The radial wall of the rotor has a central portion for mounting a wheel on the outside of the rotor and to the second part of the bearing block on the inside of the rotor. The wheel is mountable to the motor at the central portion of the radial wall of the rotor for connection to a vehicle by the bearing block. The outside of the circumferential wall of the rotor has no load-bearing portions.

U.S. Pat. No. 9,862,264, issued on Jan. 9, 2018 to Lampic et al., shows an in-wheel electric motor. This in-wheel electric motor comprises at least one stator, a rotor plate, a rotor tube, a bearing system, and a brake system arrange such that the rotor plate is attached to the rotor tube and to the bearing system. The opening of the rotor tube and stator is on at least one axial side larger than the largest braking system or bearing system part. The brake system and bearing system parts, along with the attachment points, are accessible when the rotor plate and outer parts of the brake system, bearing system and the rim are removed. The rim is a separate part of the rotor plate and rotor tube. The rotor plate attachment to the bearing system is in parallel to the rim attachment. On one of the flanges, there is an edge with its height smaller than the smallest radial cranny between the rotor tube and the stator.

U.S. Patent Application Publication No. 2016/0068054, published a Mar. 10, 2016 to Abe et al., teaches an in-wheel motor unit for a vehicle. This in-wheel motor unit has a drive output shaft of a drive unit body and a wheel hub shaft supported by a hub bearing with respect to a case member of the drive unit body. These are connected via a displacement absorption mechanism. The displacement absorption mechanism comprises an output shaft side drive transmission fitting portion allowing a first inner tooth portion of the drive output shaft to mesh with a first outer tooth portion of a gear coupling shaft, and a hub shaft side drive transmission fitting portion allowing a second inner tooth portion of the hub wheel shaft to mesh with a second outer tooth portion of the gear coupling shaft. The second outer tooth portion is arranged axially in the vehicle exterior side with respect to a wheel mounting surface on which a tire wheel is mounted to the wheel hub.

U.S. Pat. No. 6,819,012, issued on Nov. 16, 2004 to C. W. Gabrys, describes a flywheel energy storage system which has an energy storage flywheel supported in a low-pressure containment vessel for rotation on a bearing system. A brushless motor/generator is coupled to the flywheel for accelerating and decelerating the flywheel in order to store and retrieve energy. The flywheel is rotated in normal operation at a speed such that the generator voltage is higher than the output voltage. The power supply of the flywheel efficiently maintains power to an electrical load during an interruption of primary power by supplying power generated from the flywheel's generator.

U.S. Pat. No. 5,767,595, issued on Jun. 16, 1998 to H. A. Rosen, provides a flywheel support system that isolates the flywheel and its motor-generator from the driving environment of an electrically-powered motor vehicle. During normal operation, a mechanical gimbal system keeps the vacuum housing centered in the outer housing, reacts the spin moments generated by the motor-generator, and provides a passage for the electrical leads into the vacuum housing. A suitable liquid is placed between the outer and vacuum housings of the flywheel assembly to provide buoyancy and damping to the vacuum housing, cooling the motor-generator, and serving as one of the barriers to rotor energy and angular momentum transfer in the event of an accident or failure.

The Protean E-class in-wheel motor (see proteanelectric.com) shows a motor that can significantly improve fuel economy in hybrid configurations when compared with existing vehicles. The drive system has superior regenerative braking capabilities that allows up to 85% of the available kinetic energy to be recovered during braking.

The YASA in-wheel motor includes both radial gap and axial gap designs. In particular, this is an axial flux permanent magnet machine. The electric motors and controllers provide great efficiency and highest power and torque density for the smallest size and weight. Direct oil cooling helps the motors achieve higher continuous power.

The Nissan in-wheel motor (see Nissan-Global.com) places the motor next to the wheel and is not integrated into the wheel. By using separate front and rear electric motors, the powertrain generates 227 kilowatts of maximum output and 680 Nm of maximum torque. This output is complemented by the ultra-high-precision motor control that offers highly responsive, yet smooth, acceleration.

The Elaphe in-wheel motor (see in-wheel.com) is a compact in-wheel motor with an integrated standard disc brake, a standard outer caliper, and a standard hub bearing. It is designed to fit the original vehicle knuckle because of a packaging concept.

The Printed Motor Works in-wheel motor (see https:\\www.printedmotorworks.com industries automotive) allows the car to use regenerative braking and captures over 50% of the kinetic energy by using a bank of supercapacitors in the front of the car to store the electrical power generated.

The Eco-Move in-wheel motor (see https: www.ecomove-emobility.net about-us) has an in-wheel electric powertrain that is powerful and compact. The entire power train is located within the wheel because of a compact traction motor. Traction and braking using a disc calipers are included.

These prior art in-wheel motors fail to integrate energy storage directly into the removable wheel assembly. As such, an easy and simple retrofit of the wheel onto the vehicle cannot be achieved. In the past, these power systems require energy storage at a location away from the wheel. As such, complex wiring schemes and control systems are required in order to effectively integrate the energy storage with the wheel motor.

It is an object to the present invention to provide a wheel motor in which energy storage is integrated into the wheel housing.

It is another object of the present invention to provide a wheel motor that can be retrofitted to existing wheel stations of internal combustion engines and other powered vehicles.

It is another object of the present invention to provide a wheel motor that can be easily installed using conventional tools.

It is another object of the present invention to provide a wheel motor that provides acceleration boosts and deceleration energy recovery.

It is another object of the present invention to provide a wheel motor that offers fuel use reduction.

It is another object of the present invention to provide a wheel motor that effectively reduces emissions.

It is another object of the present invention to provide a wheel motor that has a relatively low cost.

It is another object of the present invention to provide a wheel motor that is adaptable to a wide variety of vehicles.

It is still another object of the present invention to provide a wheel motor that can be stackable in series.

It is another object of the present invention to provide a wheel motor that is adaptable to bicycles.

It is a further object of the present invention to provide a wheel motor that requires no alterations in the engine, transmission, computer control module or brake system of the vehicle.

It is still a further object of the present invention that effectively provides a small package for energy storage as a result of the adaptive switching.

These and other objects and advantages of the present invention will become apparent from a reading of the attached specification and appended claims.

BRIEF SUMMARY OF THE INVENTION

The present invention is a wheel assembly for a vehicle. This wheel assembly has a rotor housing adapted to be affixed to a non-rotatable portion of the vehicle, a stator housing adapted to be affixed to a wheel hub of the vehicle so as to be rotatable relative to the rotor housing, and an energy storage module affixed only to the stator housing. The stator housing has a support structure. The support structure has a wheel rim. The rotor housing has permanent magnets therein. The stator housing has windings therein. The windings of the stator housing and the permanent magnets of the rotor housing define an air gap therebetween. The air gap extends concentric to an axis of rotation of the wheel hub. The energy storage module is cooperative with the windings of the stator housing and with the permanent magnet of the rotor housing so as to receive and transmit energy from and to the windings relative to a motion of the vehicle. A tire can be affixed to the wheel rim of the rotor housing.

A torque restraint arm is affixed to the rotor housing and to the non-rotating portion of the vehicle. A motor shaft is attached directly to the rotor housing and to the torque restraint arm. The motor shaft is supported by an outer race of motor shaft bearings. The motor shaft bearings have an inner race adapted to connect to the vehicle through the wheel hub and wheel bearings. The torque resistant arm may have a mechanical or electromechanical quick-disconnect adapted to engage with the non-rotating portion of the vehicle.

The energy storage module has a housing affixed to the stator housing. Energy storage module has an energy storage element that is selected from the group consisting of capacitors, ultra-capacitors, chemical batteries, solid-state batteries and combinations thereof.

The permanent magnets of the rotor housing are positioned radially inwardly of the windings of the stator housing. The energy storage module has an accelerometer therein. The accelerometer is adapted to detect an acceleration or deceleration of the vehicle. The energy storage module can have control electronics therein. Alternatively, the control electronics can be mounted in a different location on the wheel motor than the energy storage module. The control electronics are adapted to transfer power from the energy storage module to the windings during the acceleration of the vehicle and to transmit power from the windings during the deceleration of the vehicle.

The present invention is also an assembly that comprises a vehicle having a plurality of wheel stations, and a wheel assembly affixed to at least one of the plurality of wheel stations. Each wheel station of the plurality wheel stations has a wheel hub, wheel bearings and wheel bolts. The wheel hub is connected to a hub shaft. The wheel assembly is affixed to the wheel hub and bolted to the wheel bolts.

The wheel assembly includes a rotor assembly affixed to a non-rotatable portion of the vehicle, a stator housing affixed to the wheel hub of the vehicle so as to be rotatable relative to the rotor assembly, and an energy storage module affixed only to the stator housing. The rotor assembly has a support structure. The support structure has a wheel rim. The rotor housing has permanent magnets therein.

The stator housing has windings therein. The windings of the stator housing and the permanent magnets of the rotor housing define an air gap therebetween. The air gap extends concentric to an axis of rotation of the wheel hub.

The energy storage module is cooperative with the windings of the stator housing and with the permanent magnets of the rotor housing so as to receive and transmit energy from and to the windings relative to a motion of the vehicle.

A tire is affixed to the wheel rim of the stator housing. A torque restraint arm is affixed to the rotor housing and to the non-rotating portion of the vehicle. A motor shaft is attached directly to the rotor housing and to the torque restraint arm. The motor shaft is supported by an outer race of the motor shaft bearings. The motor shaft bearings have an inner race connected to the vehicle through the wheel hub and the wheel bearings.

The energy storage module has a housing affixed to the stator housing. In particular, the energy storage module has an energy storage element selected from the group consisting of capacitors, ultra-capacitors, chemical batteries, solid-state batteries and combinations thereof. The energy storage module has an accelerometer. The accelerometer is adapted to detect an acceleration or deceleration of the vehicle. The energy storage module can include control electronics therein or the control electronics can be positioned on the wheel motor independent of the energy storage module. The control electronics are adapted to transfer power from the energy storage module to the windings during the acceleration of the vehicle and a transfer power from the windings during the deceleration of the vehicle.

The non-rotatable portion of the vehicle is either a steering knuckle for a wheel station in which the wheels extend or the back of the wheel hub.

The wheel hub described herein is installed as a single unit. Installation is completed by attachment of the torque restraint arm from the wheel motor to the non-rotatable portion of the vehicle. The components are divided between those that rotate and those that are stationary. In the present invention, the rotor is stationary and the stator is allowed to rotate. The stationary rotor is guided in place by auxiliary bearings. These auxiliary bearings are supported by the wheel hub and its bearings. The purpose of these auxiliary bearings is to preserve an accurate radial air gap between the stator and rotor for optimum electromechanical operation of the wheel motor. Additionally, since the stationary rotor housing is partially supported by the auxiliary bearings, a less robust structural attachment is required to the stationary wheel structure. This makes for a simplified installation and removal of the wheel motor.

The configuration of the present invention is a novel design that permits fuel savings and emissions reductions similar to those of electric vehicles, but retrofitable to fossil-fueled vehicles. The wheel motor is an in-wheel motor design. Unlike in-wheel motors available commercially today, the present invention integrates the energy storage system directly into the assembly. This offers the benefit of regenerative energy braking without the added cost of larger, more expensive batteries typically found on electric vehicles.

As will be described hereinafter, the retrofitting of a fossil-fueled vehicle with the wheel motors of the present invention results in a 57% reduction in fuel use and emissions output for stop-and-go traffic typically up to 40 mph. The technology can also provide acceleration boosts and energy recovery during deceleration of higher velocity driving cycles, such as at 50 miles an hour to 65 mph or 60 mph to 70 mph.

The intended market is for a low-cost retrofit for fossil-fueled cars and trucks. The present invention is focused on performance improvement during start-and-go traffic while reducing fuel use and emissions. A secondary action of the present invention is to assist with power boost at highway speed. The wheel motor the present invention is also applicable to off-road vehicles, both personal and commercial. These off-road vehicles can include mining vehicles, logging vehicles, and site-restricted markets, such as intermodal operations. The present invention is also applicable as a retrofit to conventional bicycles so as to produce electric bicycles at lower cost.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

FIG. 5 is a graph of acceleration ramp of vehicle speed versus time.

FIG. 6 is a graph of speed ramp without inclination and headwind.

FIG. 9 is a graph showing vehicle speed versus the energy of the wheel motor over time.

FIG. 10 is a graph of vehicle speed versus discharge/ charge forces and vehicle force losses per time step.

DETAILED DESCRIPTION OF THE INVENTION

Figure 1:
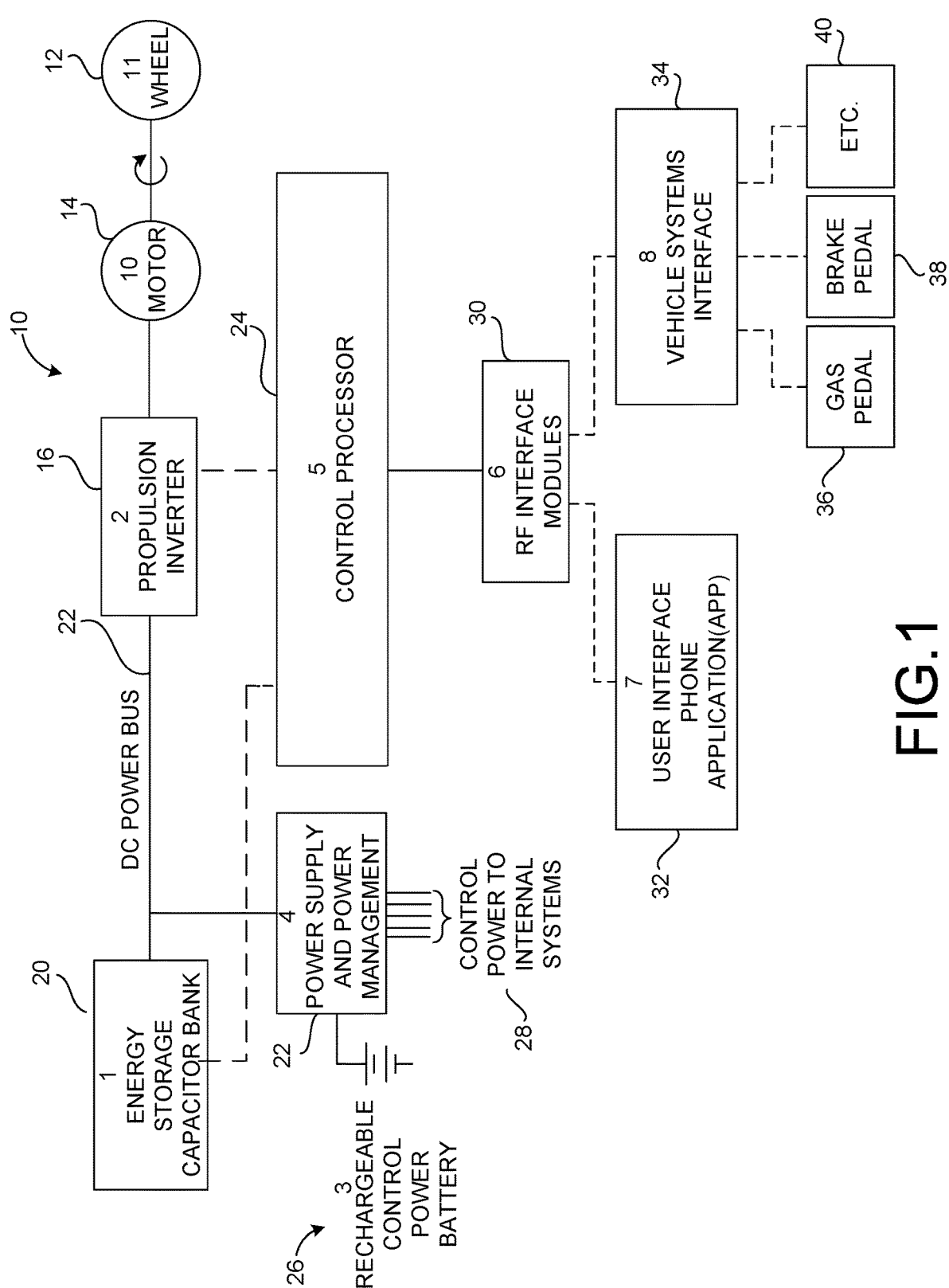
FIG. 1 is a block diagram showing the system architecture associated with the radial gap wheel motor system supported on auxiliary bearings in a parallel arrangement of the present invention.

Referring to FIG. 1, Referring to FIG. 1, there is shown the electrical system topology 10 associated with the wheel motor of the present invention. In particular, this electrical system topology shows a wheel 12 that is driven by a motor 14. As will be described hereinafter motor 14 will be part of wheel 12 and will cause the permanent magnets and windings to cooperate with each other for the driving of the wheel 12 or for the regenerative braking of the wheel 12. A propulsion inverter 16 switches the DC power from the energy storage capacitor bank 20 into voltages required by the motor 14. This inverter 16 can take any form such as a common 6H, isolated windings with 2H bridges, matrix converters, etc. A DC power bus 22 extends between the energy storage capacitor bank 20 and the propulsion inverter 16. The motor 14 can be any type of electric motor, such as an AC motor, DC motor, and induction motor, and a permanent magnet motor (including neither axial gap or radial gap arrangements).

The energy storage capacitor bank 20 stores energy during braking and supplies energy during acceleration. The energy storage bank 20 can be any type of capacitor, ultra-capacitor, chemical batteries, solid-state batteries, or combinations of capacitors and chemical batteries.

An internal power supply 22 utilizes energy stored or being generated or supplies electrical power to the control circuitry associated with the control processor 24. An internal battery 26 can be charged from the internal power supply 22. This battery 26 supplies power when the vehicle is not able to recharge the energy storage capacitor bank 20, such as following a cold start. The power supply 22 can also, in an alternative embodiment, deliver power to internal systems 28.

The control processor 24 contains control logic. The electronics contained in the control processor 24 generate gating signals for the inverter 16 and internal switching based on inputs from internal sensors, remote controls user configuration, etc. The control processor 24 can also be connected, optionally, with a radio frequency interface module 30. Radio frequency interface module can be configured so as to allow monitoring signals from the wheel 12, the motor 14 and the energy storage capacitor bank 20 to be monitored at user interface phone application 32. Alternatively or furthermore, the radio frequency interface module 30 can transmit signals to a vehicle systems interface 34 for cooperation with gas pedal 36, brake pedal 38, and other systems within the vehicle 40.

As shown in FIG. 1, there are various electrical lines connecting the various components. Importantly, the propulsion inverter 16, the energy storage capacitor bank 20 and the control processor 24 can be mounted onto the wheel 12. As such, all of the operational components for the system of the present invention are confined to the wheel structure. As a result, it is not necessary to extend lines throughout the vehicle. All that is necessary is to replace the existing wheel and tire with the present wheel motor 10.

Figure 2:
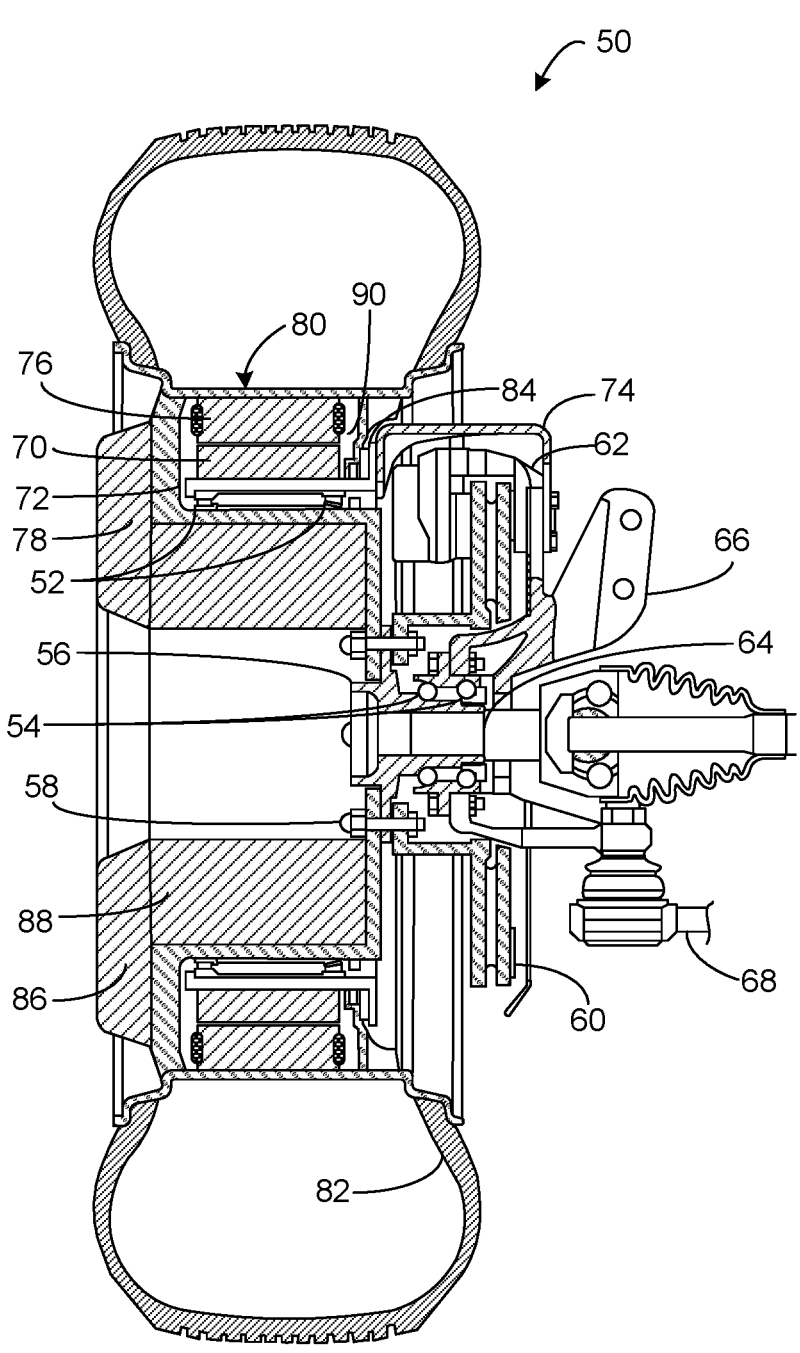
FIG. 2 is a cross-sectional view showing the wheel motor in accordance with the teachings of the preferred embodiment of the present invention.

FIG. 2 shows a cross-section of the radial gap wheel motor 50 that is supported on auxiliary bearings 52 in a parallel arrangement. In the construction of the present invention, there are two distinctive mechanical topologies for the wheel motor 50. FIG. 2 shows a parallel arrangement topology (as opposed to a series arrangement topology). The difference between the parallel arrangement topology and a series arrangement topology are differentiated by how the torque output of the wheel motor 50 is resolved. The parallel approach, as shown in FIG. 2, resolves torque through a structural link which is attached to a non-rotating portion of the vehicle. The parallel arrangement shown in FIG. 2 is configured so as to include both the hub bearings 54 of the vehicle and a set of added auxiliary bearings 52. The arrangement of the wheel motor 50, as shown in FIG. 2, is usable for both steered and non-steered vehicles and for both driven and non-driven wheel stations.

FIG. 2 specifically shows a conventional wheel hub 56, wheel bearings 54, wheel bolts and lugs 58, brake rotor 60 and brake caliper 62. The wheel shaft 64 is attached to the driven stub shaft of the vehicle. The driven stub shaft would not be required for a non-driven configuration. These components are typical manufacturer's products included with the original vehicle. To the extent that the wheel motor 50 of the present invention is associated with a steered wheel, FIG. 2 shows the conventional steering knuckle 66 and steering support joint 68. The steering-related components are also unaltered as supplied with the vehicle.

The wheel motor 50, as shown in FIG. 2, has a non-rotating rotor housing 70. This rotor housing 70 is structurally integrated into the motor shaft 72. The motor shaft 72 is attached to a rotor restraint arm 74. As such, the torque generated by the actions of the motor/generator are conveyed to the non-rotating portion of the vehicle (and in particular to the vehicle frame) through the motor shaft 72 and the restraint arm 74. The restraint arm 74 can be bolted to the steering knuckle 66 or could be attached to directly to the non-rotating back of the wheel hub 56. The installation and removal of the wheel motor 50 can be facilitated by a mechanical or electromechanical quick-disconnect associated with the restraint arm 74. The rotor housing 70 has permanent magnets and laminations therein.

The motor shaft 72 is guided in place by the outer race of the auxiliary motor shaft bearings 52. The inner race of the auxiliary motor shaft bearings 52 are tied to the vehicle frame through the wheel hub 56 and the wheel bearings 54.

The stator housing 76 is structurally integrated into a purpose-built inner wheel rim support structure 78. The inner wheel rim support structure 78 is bolted to the wheel hub 56 by conventional wheel bolts and lugs 58. An outer wheel rim 80 is located at the outer periphery of the inner wheel rim support structure 78. The outer wheel rim 80 is shown as having the wheel tire 82 positioned thereon and affixed thereto. The stator housing 76 is a rotating section of the motor/generator of the wheel motor 50 and includes windings, air gaps and laminations. Motor shaft seals 84 are included so as to protect the motor/generators from debris. Cooling passages can be embedded into the wheel motor 50 for the rejection of heat generated during operation.

FIG. 2 shows that there is an electronics module 86 and an energy storage module 88 that rotate with the stator housing and support structure 76. The electronics module 86 includes sensors, computer controllers, inverters, DC-DC converters, and cooling passages. The energy storage module 88 includes energy storage devices, charge balancing networks, and cooling passages. The energy storage can be capacitors or chemical batteries, or combinations of these. The chemical batteries could also include solid-state batteries. The capacitors can also include ultra-capacitors.

The entire wheel motor 50 is installed as one unit onto the vehicle wheel assembly. The wheel motor 50 is bolted onto the wheel hub 56 by the wheel bolts and lugs 58. The rotor restraint arm 74 is then connected. Removal is the reverse of this procedure.

In this configuration, the wheel motor 50 is installed as a single unit. Installation is completed by attachment of the torque restraint arm 74 to a non-rotating portion of the vehicle. The components are divided between those that rotate and those that are stationary. In the present wheel motor 50, the rotor is stationary and the stator is allowed to rotate. The stationary rotor housing 70 is guided in place by auxiliary bearings 52. These auxiliary bearings 52 are supported by the wheel hub 56 and its bearings 54. The purpose of the auxiliary bearings 52 is to preserve an accurate radial air gap 90 between the stator housing 76 and the rotor housing 70. Air gap 90 is generally concentric to an axis of rotation of the wheel hub 56. The maintenance of the accurate radial air gap between the stator housing 76 and the rotor housing 70 (or between the permanent magnets of the rotor housing 70 and the windings of the stator housing 76) provides optimum electromechanical operation of the wheel motor 50. Since the stationary rotor housing 70 is partially supported by the auxiliary bearings 52, a less robust structural attachment is required to the stationary wheel structure. This makes for a simplified installation and removal of the wheel motor 50.

Figure 3:
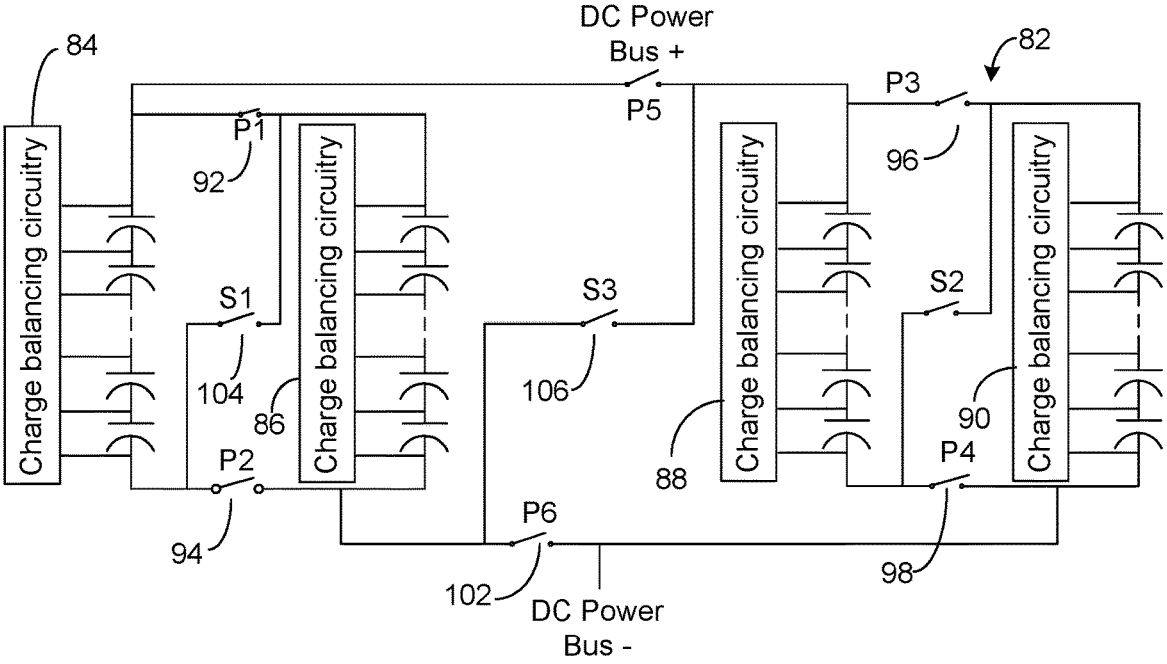
FIG. 3 is an electrical schematic showing the switching devices associated with the capacitors and adaptive voltage control as used in the energy storage module of the present invention.

FIG. 3 shows a novel approach that uses adaptive switching to change the circuit ordering of the capacitors. The capacitors are divided into banks 84, 86, 88 and 90. These banks 84, 86, 88 and 94 of a convenient size. At high states of charge, the capacitor banks 84, 86, 88 and 90 are connected in parallel. As the charge depletes and the voltage falls, the banks 84, 86, 88 and 90 are switched into series combination so as to raise the voltage to a useful range once again. The reverse is also true. As charge builds and voltage rises, the capacitor banks 84, 86, 88 and 90 are then switched into a parallel arrangement.

Specifically, when all capacitor banks 84, 86, 88 and 90 are in parallel, switches 92, 94 96, 98, 100 and 102 are closed and switches 104, 106 and 108 are open. This configuration gives the lowest voltage for a given charge level. As the charge depletes and voltage falls, the capacitor banks 84, 86, 88 and 90 can be switched into a series-parallel configuration by opening switches 100 and 102 and closing switch 106. This places half of the capacitor banks in series and half in parallel so as to double the voltage and allowing the inverter to continue to discharge the capacitor banks. Again, as voltage falls, switches 92, 94, 96 and 98 are now open and switches 104, 106 and 108 closed. This puts all the capacitor banks 84, 86, 88 and 90 in series so as to double the voltage and allowing the inverter to continue to charge the capacitor banks until 98% of the capacitor energy is recovered.

Multiple switch combinations and topologies are possible. This is the principal can be reduced to a single series-parallel switching arrangement or extended to more banks for finer voltage control. The method illustrated in FIG. 3 improves the effective storage utilization of the capacitor banks 84, 86, 88 and 90 from 75% to over 98%. Importantly, this allows the package that contains the capacitor banks 84, 86, 88 and 90 to be relatively small and included within the design of the wheel.

Figure 4:
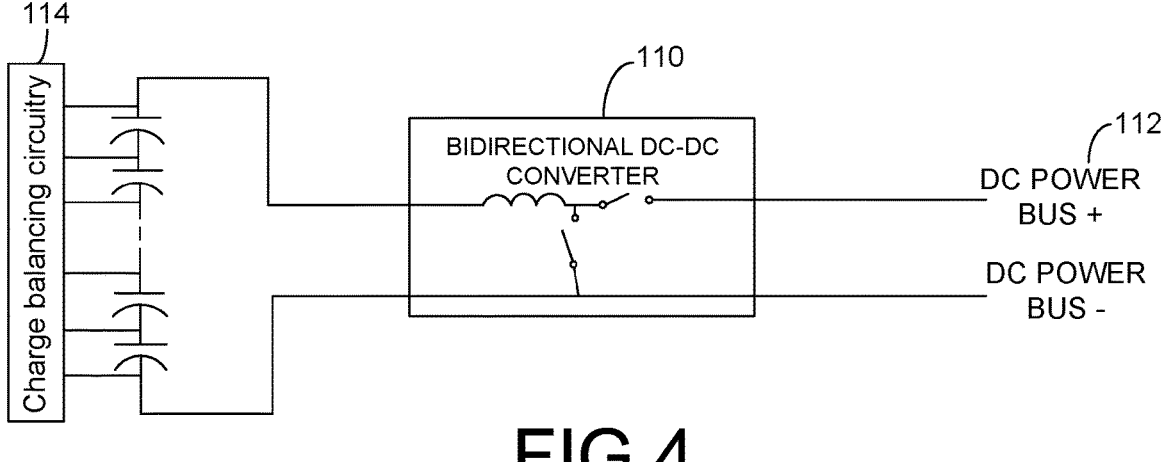
FIG. 4 is an electrical schematic and block diagram showing an alternative embodiment of a DC-DC converter for the control of voltages in the energy storage module of the present invention.

FIG. 4 shows an alternative embodiment to that of FIG. 3 by showing a bidirectional DC-DC converter 110 used for the purposes of boosting the voltage to the DC power bus 112 and reducing the voltage to the capacitor bank 114 that is generated by the motor/inverter during deceleration. The DC-DC converter 110 is able to move power in either direction.

FIG. 4 shows a generic example of the DC-DC converter 110. Multiple topologies can be used to achieve the management of voltage and power. The percent utilization of the capacitor banks storage capability can depend upon the details of the DC-DC converter topology choice and its minimum voltage requirements. This technique can also be combined with the previous capacitor switching technique (as shown in FIG. 3).

It should be noted that the high efficiency of the wheel motor design of the present invention and the part-time duty cycle associated with stop-and-go traffic patterns, heat build-up can be controlled by either passive or active thermal management. For passive control, heat can be dissipated through both conductive paths and convective thermal paths facilitated as a result of the rotation of the wheel. Air coolant passages and large area fins can be integrated so as to assist with heat extraction. Active thermal control can also use sealed heat pipes with a two-phase cooling system optimized for the maximum and minimum temperatures expected to be encountered by the system of the present invention.

A significant amount of analysis has been carried out with respect to the wheel motor of the present invention. It is important that the motor torque be sized to achieve acceleration commensurate with engine-driven performance of conventional combustion engine drives. For sizing the motor torque from the wheel motor of the present invention, a typical SUV passenger vehicle is considered. In particular, this is a four-door, 2019 Ford Edge. The rolling resistance is a maximum of 0.015 over the 0 to 30 mph speeds and commensurate for an ordinary passenger car on concrete and new asphalt. The aerodynamic drag coefficient for the vehicle is 0.36. In this configuration, each wheel station of the vehicle is fitted with the wheel motor assembly.

Based upon current information, under full acceleration, the Ford Edge achieved 60 miles an hour at 6.8 seconds and ultimately can reach 100 mph at 20.0 seconds. Using a second order polynomial fit, a velocity versus time curve is produced in FIG. 5. For a more realistic driving pattern, the time-to-speed curve of FIG. 5 was reduced by 25%. The vehicle simulation model was then exercised. As shown in FIG. 6, and at 75% of full throttle a constant torque rating of 435 ft-lb (59N-M) was needed to achieve a vehicle speed of 30 mph in 4.4 seconds. A velocity of 40 miles an hour is reached at 5.8 seconds.

Figure 7:
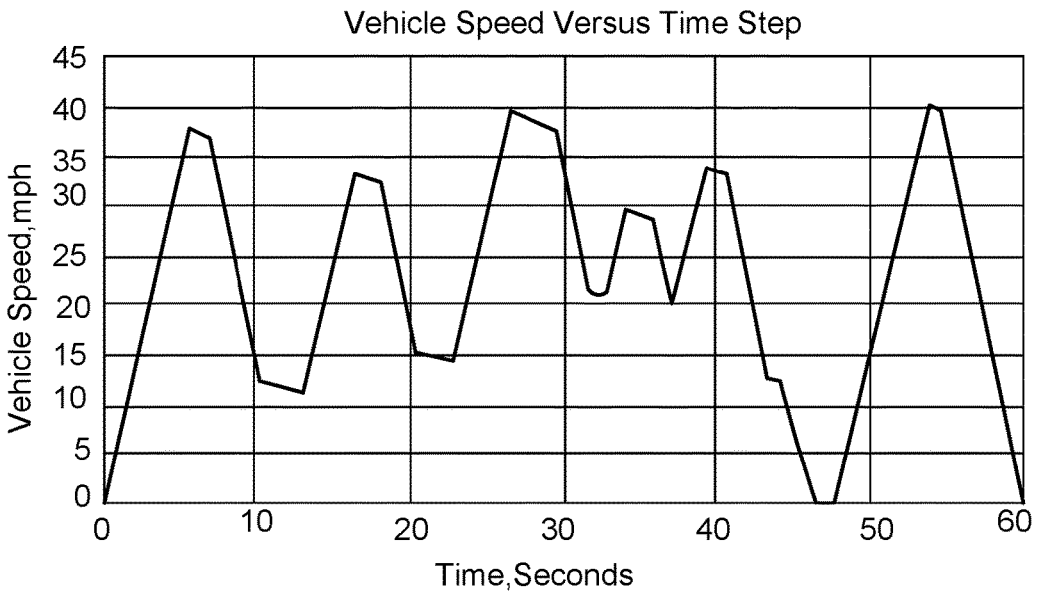
FIG. 7 is a graph showing vehicle speed versus time during arterial and local traffic congestion.

Based upon typical traffic patterns in arterial and local congested traffic patterns, a 60 second representation of vehicle speed versus time is illustrated in FIG. 7. This shows vehicle speed over a 60 second representative segment. The segment numerically replicates stop-and-go traffic with intermittent speeds ranging from 40 miles an hour to 0 mph. The vehicle simulation model was exercised over this traffic segment to determine the amount of stored energy needed for the wheel motor operation of the present invention. The amount of energy storage capacity (Wh) needed was determined by varying the capacity until the state of charge (SOC) range was maintained between the setpoints of 90% and 10%. This analysis determined that 120 Wh of stored energy capacity was required.

The following is a simulation showing the benefits of reduced fuel use and emissions with the wheel motor technology of the present invention as applied in congestive traffic. Specifically, the following TABLE 1 lists some of the key modeling parameters as follows:

TABLE I

| Parameter Description | Value |
| --- | --- |
| Modeling Time Step | 100 ms |
| KRW's Torque Rating | 435 ft-lbf (590 nm) |
| Number of KRWs | All four wheel stations |
| Capacity of Capacitor ESS | 120 Wh, 30 Wh each |
| % Depth of Discharge for ESS | 80% |
| Maximum State of Charge | 90% |
| Minimum State of Charge | 10% |
| Added Vehicle Energy for Losses per Time Step, Initiated at Low SOC | 1.00 Wh at 40 mph and Linear with Speed Initiated at 50% SOC |
| Added Vehicle Energy for Losses per Time Step, Initiated at High SOC | 0.24 Wh at 40 mph and Linear with Speed Initiated at 70% |
| KRW One Way Efficiency | 90% |
| Vehicle Engine Efficiency | 30% |
| Vehicle Transmission/ Drivetrain Efficiency | 70% |

As mentioned earlier, this analysis is a linear solution with a time step of 100 ms. For the selected vehicle (i.e. the 2019 Ford Edge), the wheel motor the present invention is torque-rated at 435 ft-lb (590 Mm) at all four wheels. Total capacity for the ESS is 120 Wh. Discharge is regulated between a SOC of 90% and 10%. The one-way efficiency of the wheel motor of the present invention is 90%. Vehicle engine and transmission efficiencies are 30% and 70%, respectively. The energy storage system of the present invention is charged by extracting vehicle kinetic energy through regenerative braking. Therefore, incremental inputs of vehicle energy are required to overcome parasitic losses and electrical losses. Vehicle energy input is commanded based on a two-step approach to maintain proper SOC control in the energy storage system.

Figure 8:
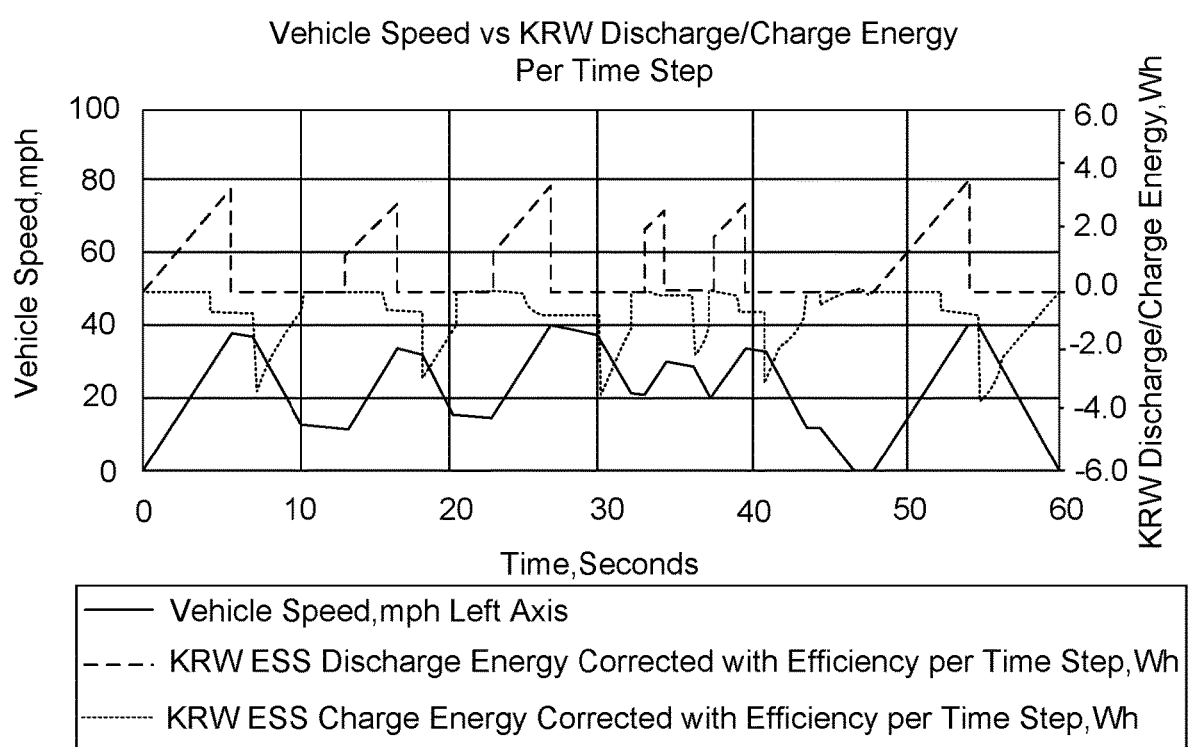
FIG. 8 is a graph of vehicles speed versus discharge/ charge energy for losses.

The vehicle model was exercised over the 60 second, stop-and-go traffic segment discussed in association with FIG. 7 hereinabove. FIG. 8 shows the load-leveling action of the wheel motor of the present invention. For example, the wheel motor of the present invention applies positive wheel torque. This added energy is shown in FIG. 8. For decreased speed the wheel motor of the present invention applies negative torque. This negative or braking energy is shown as the dashed line in FIG. 8. During regenerative braking, the energy storage system is recharged.

FIG. 9 shows the changing SOC of the energy storage system as a result of vehicle acceleration and deceleration. The energy storage system is controlled between the SOC setpoints of 90% and 10%. The energy supplied by the engine to negate all losses per time step is also shown. Losses include electrical losses for the wheel motor, aerodynamic losses, and tire rolling resistance losses.

FIG. 10 graphically shows the present individual parasitic losses per time step. The wheel motor of the present invention is a constant torque rating of 435 ft-lb. However, torque is varied to achieve the needed acceleration to match target velocities. As torque increases, its electrical losses also increase. Also, increased velocity results in increased aerodynamic and rolling resistance losses. Total energy losses over 60 seconds are in the order of approximately 170 Wh.

Using the parameters shown in TABLE 1, the model was exercised over a 30-minute segment of congested traffic replicated from the 60 second traffic data found in FIG. 7. By comparing values with and without the wheel motor of the present invention, fuel savings was determined. Total energy for vehicle propulsion without the wheel motors is 395 Wh. During regenerative braking, the wheel motor of the present invention recovers 314 Wh of energy. This value is not equal to the acceleration energy of 395 Wh since aerodynamic and tire rolling resistance losses are parasitic and not recoverable. Therefore, the energy required by the wheel motor of the present invention for vehicle propulsion is 170 Wh.

The stored energy of the wheel motor of the present invention is derived from recovery of the vehicle's kinetic energy. All calculations to convert energies is shown in the following TABLE 2 into gallons are subject to engine and driveline inefficiencies. Assuming efficiencies for the gasoline engine and transmission and driveline of 30% at 70%, respectively, operation with the wheel motors of the present invention reduces fuel use by 57%. Fuel reduction directly scales with emissions. Therefore, emissions are also reduced by 57%. This is shown below:

TABLE II

| Vehicle Propulsion Energy with and without KRW | | | |
| --- | --- | --- | --- |
| Vehicle propulsion energy needed without KRW | 395.3 | Wh | 1.41 gallons |
| Vehicle propulsion energy supplied by KRW | 395.3 | Wh | 1.41 gallons |
| Vehicle propulsion energy recovered by KRW | −313.7 | Wh | −1.12 gallons |
| Net vehicle propulsion energy supplied by KRW | 81.6 | Wh | 0.29 gallons |
| Total KRW electrical losses | 88.3 | Wh | 0.31 gallons |
| Total KRW energy | 169.9 | Wh | 0.61 gallons |
| Fuel and Emission Savings with KRW | | | 57.0% |

The wheel motor operates without any control commands to or from the vehicle. The operator accelerates and decelerates (i.e. brakes) in a normal fashion during stop-and-go traffic conditions. Based on the multi-axis acceleration measurements conducted on the wheel motor the present invention, the wheel motor senses when the vehicle is accelerating or braking. Errors induced by hilly or uneven terrain are avoided using this multi-axis approach. Accelerometers integrated into the energy storage system can be applied in order to determine whether the vehicle is accelerating, decelerating and/or braking. When the accelerometer of the vehicle detects vehicle acceleration, positive torque is delivered by the wheel motor. The torque level is determined by acceleration level and the SOC of the wheel motor. The operator can cancel acceleration by tapping the brake pedal with enough force to cause slight vehicle deceleration and momentarily disengaging the wheel rotor. The accelerometer senses acceleration/deceleration and then resets the wheel motor to either deliver propulsion or braking actions. When the accelerometer of the wheel motor detects deceleration caused by an operator applying the conventional brakes, negative torque is applied to the vehicle. The torque level is determined by operator settings, deceleration level and the SOC of the wheel motor. Slight engine throttle applied by the operator resulting in acceleration will cancel the braking action of the wheel motor. The wheel motor can be reset to deliver propulsion or braking actions. During deceleration, the energy storage system is recharged to the extent possible permitted by the available vehicle kinetic energy. Efficiency losses slowly consume the stored energy in the energy storage system. When the energy storage system is at a low SOC, the wheel motor gradually decreases its share of accelerating torque until it is recharged. The next time the operator has increased vehicle speed with the gas pedal and begins to slow the vehicle by braking, the wheel motor recovers its SOC by capturing the vehicle's kinetic energy. Likewise, if the energy storage is at high SOC, the wheel motor gradually decreases its share of braking torque. In all circumstances the operator is able to control vehicle speed with the brake pedal and foot throttle.

Vehicle parasitic and electrical efficiency losses also slowly consume the stored energy in the wheel motor. When the energy storage system is at a low SOC, the wheel motor gradually decreases its share of accelerating torque. The operator always can smoothly vary acceleration with the gas pedal. The wheel motor then uses the next braking action to recharge the energy storage system. Likewise, if the energy storage system is at a high SOC during braking, the wheel motor gradually decreases its share of braking torque until the actions of the wheel motor lower the SOC. The integrated control allows additional inputs for redundant control and rapid response in acceleration.

The wheel motor of the present invention permits fuel savings and emissions reduction similar to that of electrical vehicles in which the wheel motor is retrofitable to fossil-fueled vehicles. Unlike the wheel motors available commercially today, the present invention integrates an energy storage system directly into the assembly. This offers the benefit of regenerative energy braking without the added cost of larger, more expensive batteries typically found on electrical vehicles.

Computer simulations were completed to determine fuel savings and emissions reductions for typical stop-and-go congested traffic. The retrofitting of a fossil-fueled vehicles with the wheel motors of the present invention can result in the 57% reduction in fuel use and emissions output for stop-and-go traffic up to 40 miles per hour. The technology can also provide acceleration boosts and energy recovery during deceleration at higher velocity driving cycles, such at 50 miles per hour to 65 mph or 60 miles an hour to 70 miles an hour. The retrofit with the technology of the present invention results in significant fuel savings and emissions reductions in typical stop- and having go traffic congestion.

The controls schemes in the present invention can either be independent or integrated. The present invention utilizes a novel approach of adaptive switching between parallel and series circuit ordering of the capacitors and the DC-DC converted-based adaptive voltage control to optimize the wheel motor operation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wheel assembly for a vehicle, the wheel assembly comprising:
   a first housing having a torque restraint arm adapted to be affixed to a non-rotatable portion of the vehicle, said first housing having a support structure, said first housing having permanent magnets therein;
   a second housing adapted to be affixed to a wheel hub of the vehicle so as to be rotatable relative to said first housing, said second housing having windings therein, wherein the permanent magnets of said first housing are positioned radially inwardly of the winding of said second housing, the windings of said second housing and the permanent magnets of said first housing defining an air gap therebetween, the air gap extending concentric to an axis of rotation of the wheel hub; and
   an energy storage module affixed only to said second housing, said energy storage module being cooperative with the windings of said second housing and with the permanent magnets of said first housing so as to receive and transmit energy from and to the windings relative to a motion of the vehicle.

2. The wheel assembly of claim 1, further comprising:
   a tire affixed to a wheel rim of said second housing.

3. The wheel assembly of claim 1, wherein the torque restraint arm has a mechanical or electromechanical quick-disconnect adapted to engage with the non-rotating portion of the vehicle.

4. The wheel assembly of claim 1, said energy storage module having an energy storage element selected from the group of capacitors, ultra-capacitors, chemical batteries, solid-state batteries and combinations thereof.

5. The wheel assembly of claim 1, wherein said energy storage module has an accelerometer, the accelerometer adapted to detect an acceleration or a deceleration of the vehicle.

6. The wheel assembly of claim 5, said energy storage module having control electronics therein, the control electronics adapted to transfer power from the energy storage module to the windings during the acceleration of the vehicle and to transmit power from the windings during the deceleration of the vehicle.

7. An assembly comprising:
   a vehicle having a plurality of wheel stations, each wheel station of the plurality of wheel stations having a wheel hub and wheel bearings and wheel bolts, the wheel hub being connected to a hub shaft; and
   a wheel assembly affixed to at least one of the plurality of wheel assemblies, said wheel assembly being affixed to the wheel hub and bolted to the wheel bolts, said wheel assembly comprising:
      a first housing affixed by a torque restraint arm to a non-rotatable portion of the vehicle, said first housing having a support structure, said first housing having permanent magnets therein;
      a second housing affixed to the wheel hub of said vehicle so as to be rotatable relative to said first assembly, said second housing having windings therein, the windings of said second housing and the permanent magnets of said first housing defining an air gap therebetween, the permanent magnets of said first housing being positioned radially inwardly of the windings of said second housing, the air gap extending concentric to an axis of rotation of the wheel hub; and
      an energy storage module affixed only to said second housing, said energy storage module being cooperative with the windings of said second housing and with the permanent magnets of said first housing so as to receive and transmit energy from and to the windings relative to a motion of the vehicle.

8. The assembly of claim 7, further comprising:

a tire affixed to a wheel rim of said second housing.

9. The assembly of claim 7, said energy storage module having an energy storage element selected from the group consisting of capacitors, ultra-capacitors, chemical batteries, solid-state batteries and combinations thereof.

10. The assembly of claim 7, wherein said energy storage module has an accelerometer, the accelerometer adapted to detect an acceleration or a deceleration of the vehicle.

11. The assembly of claim 10, said energy storage module having control electronics therein, the control electronics adapted to transfer power from the energy storage module to the windings during the acceleration of the vehicle and a transfer power from the windings during the deceleration of the vehicle.

12. The assembly of claim 7, wherein the non-rotatable portion of the vehicle is either a steering knuckle or a back of the wheel hub.

* * * * *